United States Patent Office 3,196,608
Patented July 27, 1965

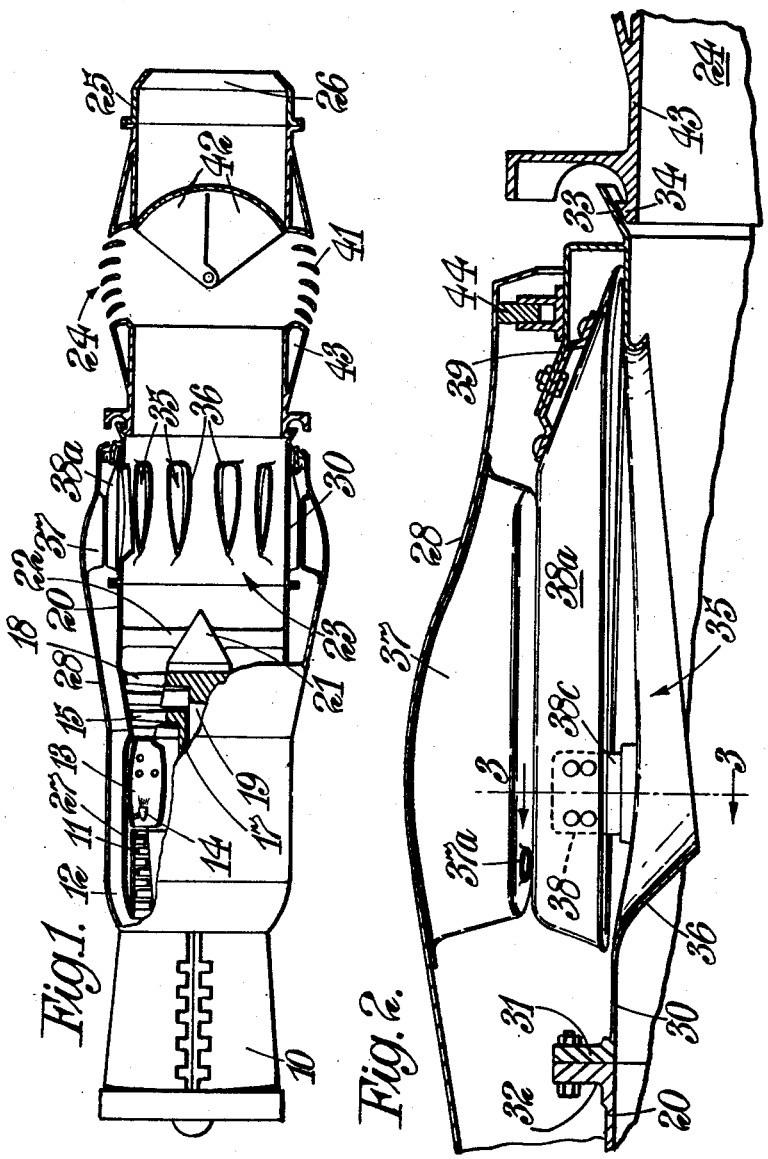

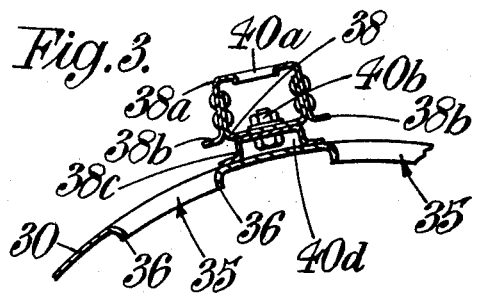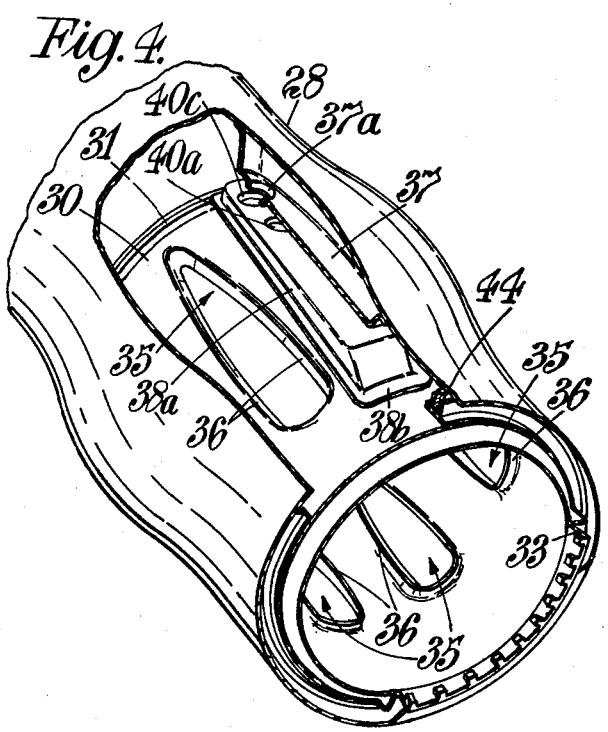

3,196,608
APPARATUS TO ADMIX BY-PASS AIR WITH EXHAUST GASES IN A BY-PASS GAS-TURBINE ENGINE
John Valentine Tindale, Alvaston, Derby, England, assignor to Rolls-Royce Limited, Derby, England, a British company
Filed June 2, 1960, Ser. No. 33,498
Claims priority, application Great Britain, June 23, 1959, 21,573/59
7 Claims. (Cl. 60—35.6)

This invention comprises improvements in or relating to gas-turbine engines.

In some gas-turbine engines air which has been compressed in the engine by-passes the engine combustion equipment and turbine or turbines and flows in a common duct with exhaust gas from the turbines before it leaves the engine exhaust assembly. Such an engine is termed a by-pass engine. Such an engine may have a low-pressure compressor and a high-pressure compressor in flow series, the by-pass air being taken from the outlet of the low-pressure compressor and by-passing the high-pressure compressor as well as the combustion equipment and the turbines.

According to the present invention, in a by-pass engine there is provided an annular wall structure forming part of the external wall of the exhaust gas duct and of the internal wall of an annular by-pass duct at its downstream end, the wall structure having in it a series of circumferentially-spaced holes constituting inlets to stub by-pass air delivery pipes projecting a short radial distance from the wall structure into the exhaust gas duct.

It is found that satisfactory mixing of exhaust gas and by-pass air can be obtained in a short length of jet pipe and without excessive pressure losses by delivering the air into the exhaust gas through such stub delivery pipes. Mixing of the by-pass air and exhaust gases is effected to enable the full potential thrust of the by-pass air and exhaust gas streams to be realised; if the streams are not mixed but are discharged separately to atmosphere part of the potential thrust is lost.

Preferably the stub delivery pipes are formed in one piece with the wall structure as flanges around the holes and are of streamline form in the direction of exhaust gas flow. Preferably, moreover, the flange forming a stub delivery pipe tapers in radial extent from its upstream end to its downstream end. Also, each stub delivery pipe is preferably inclined to deliver the air into the exhaust gas with a component of velocity in the downstream direction.

According to a feature of this invention, there is provided in the by-pass duct a series of flow dividers, one circumferentially between each pair of the holes to assist to guide the by-pass air to the holes. In one construction, each divider structure comprises a dished metal piece secured to the outer wall of the annular by-pass duct and a co-operating and oppositely-dished metal piece supported from a flanged ring provided at the downstream end of the annular wall structure. The flanged ring may in this case form also one element of a joint, for instance of the bayonet type, by which further parts of the engine exhaust assembly are positioned relative to the annular wall structure.

Preferably the engine comprises downstream of the wall structure a short jet pipe. Good mixing may be obtained even with a jet pipe whereof the length is equal to the diameter of the jet pipe.

One form of by-pass engine embodying the invention will now be described with reference to the accompanying drawings, in which:

FIGURE 1 is a diagrammatic scaled illustration of the engine, parts being in section;

FIGURE 2 is a view to a larger scale of part of FIGURE 1;
FIGURE 3 is a section on line 3—3 of FIGURE 2; and
FIGURE 4 is an isometric view, partly broken away, of the rear portion of the same engine.

The by-pass engine (FIGURE 1) comprises a low-pressure compressor 10 delivering to the entry of a high-pressure compressor 11 and a by-pass duct 12. The engine also comprises combustion equipment 13 receiving air which has been compressed in the high-pressure compressor 11, and fuel to be burnt with the air, the fuel being delivered by injectors 14. The engine also comprises a turbine system including a high-pressure turbine 15 driving the high-pressure compressor 11 through a hollow shaft 17 and an independently-rotating low-pressure turbine 18 driving the low-pressure compressor 10 through a shaft 19 extending through the shaft 17 and the high-pressure compressor 11. The engine also comprises an exhaust assembly including an exhaust outlet section formed between a turbine casing 20 and a central bullet 21 supported from the casing 20 by struts 22, a mixing section 23 wherein the by-pass air is mixed with exhaust gases, a thrust reversing section 24, and a jet pipe 25 terminating in a propelling nozzle 26.

The by-pass duct 12 is annular and is bounded internally by an outer casing 27 for the high-pressure compressor 11 and the combustion equipment 13 and by the turbine casing 20, and is bounded externally by an outer casing 28 which extends downstream to enclose the mixing section 23 of the exhaust assembly.

The mixing section 23 (FIGURES 1 to 4) of the exhaust assembly comprises an annular wall structure including a tubular wall 30 which forms both part of the external wall of the exhaust gas passage and the downstream end of the internal wall of the by-pass duct 12. The wall 30 has a bolting flange 31 at its upstream end abutting and secured to a corresponding flange 32 on the turbine casing 20. At its downstream end, the wall 30 has a flanged ring 33 adapted to be connected with a ring 34 on the thrust reversing section 24 through a bayonet type connection.

The tubular wall 30 has in it a series of, say ten, holes 35 each bounded peripherally by an internal flange 36 which forms a stub by-pass air delivery pipe projecting a short distance radially inwards into the exhaust gas passage. The flanges 36 are in one piece with the wall 30 and are of streamline form in the direction of exhaust gas flow. The radial dimension of each flange 36 decreases from the upstream end thereof to the downstream end (FIGURE 2), and each flange 36 is shaped so that the stub delivery pipe it forms is inclined to the axis of the exhaust assembly and delivers the by-pass air into the exhaust gas with a component of velocity in the downstream direction.

It is found that by injecting the by-pass air into the exhaust gases by means of such stub delivery pipes 36, good mixing can be obtained in a short length of jet pipe represented by the reversing section 24 and the parts 25, 26.

In order to assist to direct the by-pass air to the pipes 36, flow dividers are provided within the by-pass air duct 12 at its downstream end. Each flow divider is positioned between a pair of the holes 35 and comprises a dished metal piece 37 welded to the downstream end of the outer casing 28, and a co-operating structure mounted on the wall 30 and comprising an oppositely-dished sheet metal piece 38a and a U-shaped strap 38 riveted together (FIGURES 2 and 3), the part 38a having a peripheral flange 38b spaced from the wall 30. The structure 38, 38a adjacent its upstream end is bolted to a top-hat member 38c which is welded to the wall 30. A hole 40a in the piece 38a provides access to a nut 40b engaging bolt 40d. At its downstream end, the structure 38, 38a is supported by being secured to a flange 39 on the ring 33. The piece 38a has a hole 40c in it for entry of a thermocouple and there is an aligned hole 37a in the piece 37.

A seal 44 is provided between the flange 39 on ring 33 and the downstream end of the outer casing 28.

The thrust reversing section 24 comprises a wall structure 43 having in it a pair of oppositely-directed lateral apertures in which deflector vanes 41 are arranged, and a pair of valve members 42 pivoted about a diameter of the jet pipe to move between a thrust reversing position as shown in which gases are caused to flow to atmosphere through the apertures, and a normal thrust position in which the reversing section is effectively a part of the jet pipe, the apertures being covered by the valve members 42, so that the flow to the nozzle 26 is not blocked.

The extent to which the stub pipes project into the exhaust gas stream depends on a number of factors including the engine power, the operating temperatures, and the dimensions of the exhaust gas passage, the jet pipe and the by-pass duct.

The short stub by-pass air delivery pipes give rise to good mixing of by-pass air and turbine exhaust gases without excessive pressure losses in a short exhaust arrangement and good mixing is achieved without high weight and complicated structure.

I claim:

1. Apparatus to admix compressed air with exhaust gases comprising an annular wall structure defining within it an exhaust gas receiving duct, outer wall means externally of said wall structure and cooperating therewith to define a compressed air passage, said wall structure having in it a series of circumferentially spaced holes open to the compressed air passage, and a series of stub pipes on the interior of said wall structure and projecting a short distance radially and axially in a downstream direction into the exhaust gas duct, said stub pipes communicating through said holes with the compressed air passage and being open at their radially inner ends to the exhaust gas duct, the plane of each of said last mentioned openings forming an acute angle with respect to the axis of said exhaust gas duct, whereby air entering said exhaust gas duct through said stub pipes has a substantial radial component of velocity.

2. Apparatus according to claim 1, said stub delivery pipes being formed in one piece with the wall structure by inwardly projecting flanges around the holes and said stub pipes being of streamline form in the direction of exhaust gas flow in said duct.

3. Apparatus according to claim 2, each flange, which forms one of said stub delivery pipes, tapering in radial extent from its upstream end to its downstream end.

4. Apparatus according to claim 1 comprising a series of flow dividers in said compressed air passage, each flow divider being between a pair of said holes to assist to guide the compressed air to the holes.

5. A by-pass gas-turbine engine comprising a compressor, combustion equipment, a turbine and a jet pipe assembly arranged in axial flow series, an annular wall structure defining within it an exhaust gas receiving duct, outer wall means externally of said wall structure and cooperating therewith to define a by-pass compressed air passage for receiving a portion of the air compressed by said compressor, said wall structure having in it a series of circumferentially spaced holes open to the by-pass air passage, and a series of stub pipes on the interior of said wall structure and projecting a short distance radially and axially in a downstream direction into the exhaust gas duct, said stub pipes connecting through said holes with the by-pass air passage and being open at their radially inner ends to the exhaust gas duct, the plane of each of said last mentioned openings forming an acute angle with respect to the axis of said exhaust gas duct, whereby air entering said exhaust gas duct through said stub pipes has a substantial radial component of velocity.

6. A by-pass gas-turbine engine as claimed in claim 5 wherein each stub pipe tapers in radial extent from its upstream to its downstream end.

7. Apparatus to admix compressed air with exhaust gases comprising an annular wall structure defining within it an exhaust gas receiving duct, outer wall means externally of said wall structure and cooperating therewith to define a compressed air passage, said wall structure having in it a series of circumferentially spaced holes open to the compressed air passage, a series of stub pipes on the interior of said wall structure, said stub pipes projecting a short distance radially into the exhaust gas duct, and communicating through said holes with the compressed air passage and a series of flow dividers in said compressed air passage, each flow divider comprising a dished metal piece secured to the outer wall means circumferentially between a pair of said holes, a cooperating and oppositely-dished metal piece, and a flanged ring on the annular wall structure beyond said holes and supporting said oppositely-dished metal piece.

References Cited by the Examiner

UNITED STATES PATENTS

| | | | |
|---|---|---|---|
| 1,382,690 | 6/21 | Stokes | 60—30 |
| 2,088,591 | 8/37 | Ferkel | 259—4 |
| 2,308,059 | 1/43 | Decker | 60—30 |
| 2,426,833 | 9/47 | Lloyd | 259—4 |
| 2,588,532 | 3/52 | Johnson | 60—35.6 |
| 2,600,733 | 6/52 | Clift | 259—4 |
| 2,626,501 | 1/53 | Pavlecka et al. | 60—39.15 |
| 2,653,446 | 9/53 | Price | 60—35.6 |
| 2,780,058 | 2/57 | Beale et al. | 60—35.54 |
| 2,849,861 | 9/58 | Gardiner et al. | 60—35.54 |
| 2,978,865 | 4/61 | Pierce | 60—35.6 |
| 2,984,967 | 5/61 | Caddell | 60—30 |
| 2,999,672 | 9/61 | Harshman | 259—4 |
| 3,048,376 | 8/62 | Howald et al. | 259—4 |
| 3,100,627 | 8/63 | Wilde | 60—39.65 |

FOREIGN PATENTS 760,493 10/56 Great Britain.

MARK NEWMAN, *Primary Examiner.*

ABRAM BLUM, SAMUEL LEVINE, EDGAR W. GEOGHEGAN, *Examiners.*